Dec. 6, 1932.  E. PELLERIN ET AL  1,889,876
APPARATUS FOR INDICATING THE MEAN SPEED OF A VEHICLE
Filed Jan. 22, 1929  2 Sheets-Sheet 2
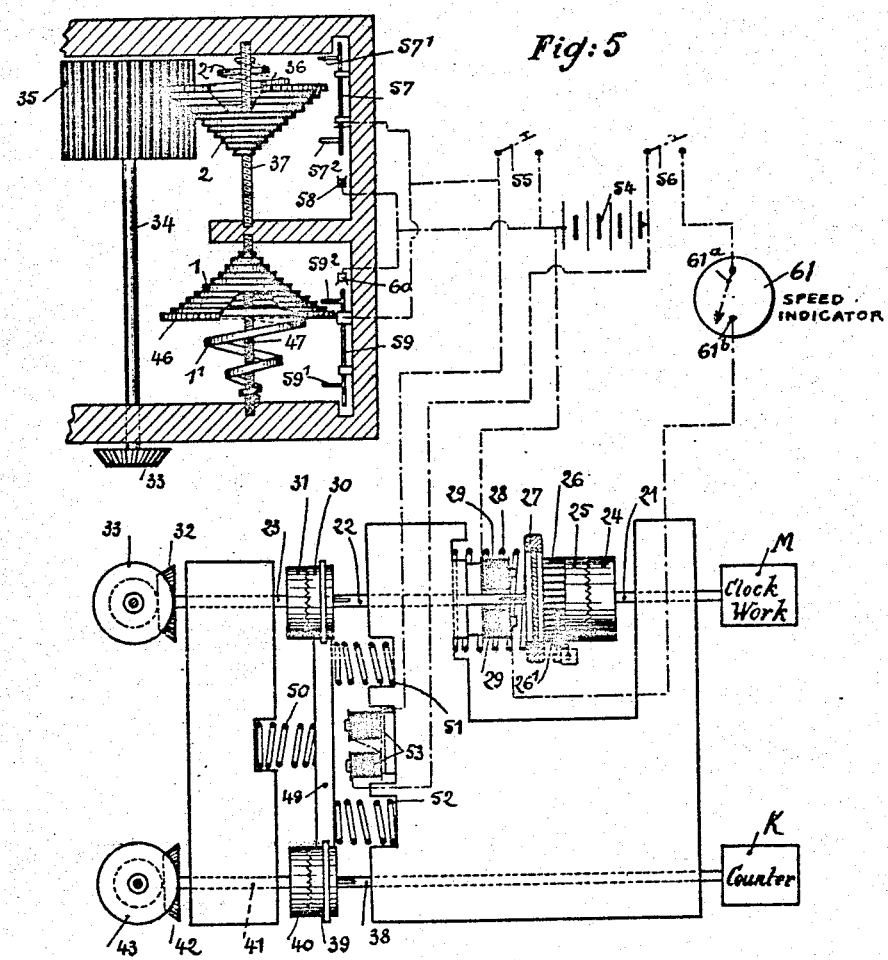
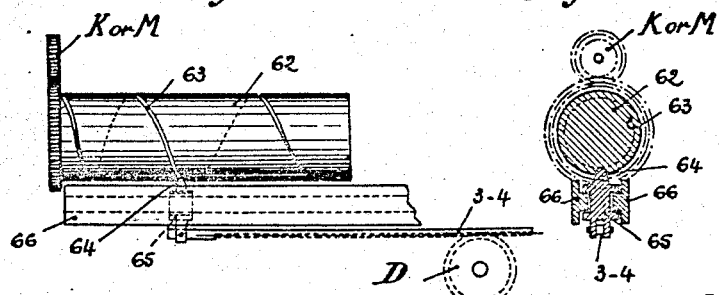
INVENTORS
ATTORNEYS Patented Dec. 6, 1932

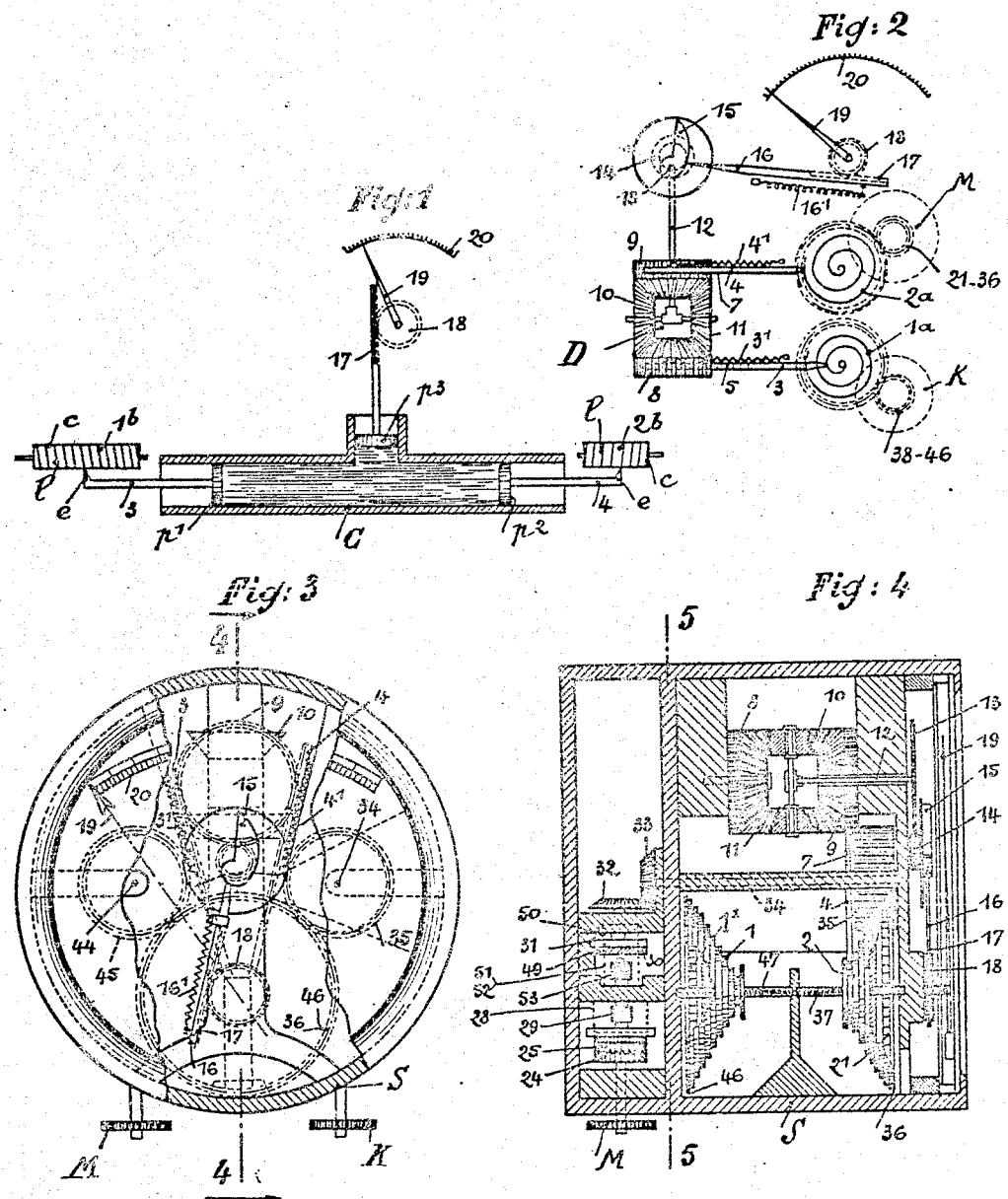
Dec. 6, 1932. E. PELLERIN ET AL 1,889,876
APPARATUS FOR INDICATING THE MEAN SPEED OF A VEHICLE
Filed Jan. 22, 1929 2 Sheets-Sheet 1

1,889,876

UNITED STATES PATENT OFFICE

ERIC PELLERIN, MARCEL HECTOR, AND PASCAL JULES CARPENTIER, OF VINCENNES, FRANCE

APPARATUS FOR INDICATING THE MEAN SPEED OF A VEHICLE

Application filed January 22, 1929, Serial No. 334,296, and in France January 24, 1928.

The present invention relates to an apparatus which permits to measure, by a logarithmic transformation, the mean speed of a vehicle at a given time after the start or the zero point.

In this latter case, let $e$ be the distance covered by the vehicle since the start, $t$ the time in consideration, and $v$ the mean speed; this affords the equation $$v = \frac{e}{t}$$

that is, $\log v = \log e - \log t$.

The distance covered $e$ is given at each instant by the mileage counter and the time by the time-piece or clockwork mounted on the vehicle. In this case, if logarithmic cams are mounted on the shaft of the hands of the said time-piece and on the shaft of the mileage register, the rollers cooperating with said cams will be displaced by quantities which are respectively proportional to the logarithms of the distance and of the time. If the rods carrying the said rollers are placed in relation with a system of a mechanical, hydraulic, electric, or like nature, permitting the difference between the displacements of the said rods to be obtained, that is, the difference between the logarithms of the distance and the time, and if this system is combined with a suitable device for transformation or restitution, the speed $v$ will be finally obtained.

The following description with reference to the accompanying drawings which is given by way of example shows the manner in which the said invention is carried into effect.

Figure 1 is a diagrammatic view of the first embodiment of the invention, showing the general principle upon which the invention is based.

Figure 2 is a diagrammatic view showing the principle employed in the second embodiment.

Figure 3 is a front view of the apparatus on the side of the dial, with parts of the said dial broken away to show the interior of the mechanism.

Figure 4 is a section on the line 4—4 of Figure 3, viewed in the direction of the arrow.

Figure 5 is a diagrammatic general view with reversal on the plane of the figure, of the part situated to the left of the line 5—5 of Figure 4, showing the details of the internal arrangements of the different parts of the apparatus.

Figures 6 and 7 relate to a particular form of construction of the logarithmic cams.

As shown in Figure 1, $1_b$ is the logarithmic cam which is actuated by the mileage counter, and it is in contact with the rod $3_b$ which is longitudinally displaced by a quantity proportional to the logarithm of the distance. In like manner, $2_b$ is the logarithmic cam which is actuated by the clockwork which acts upon the rod $4_b$. The said cams $1_b$ and $2_b$ are herein constituted by a rotating cylinder $c$ in which is formed a helical line or groove whose pitch varies according to a logarithmic law, and the rods $3_b$ and $4_b$ are provided with the pointed ends $e$ which are guided by the lines or grooves of cams $1_b$ and $2_b$ respectively. The rods $3_b$ and $4_b$ are connected respectively to the pistons $p^1$ and $p^2$ in the cylinder C containing liquid, and the said cylinder C includes a third piston $p^3$ which is displaced by a quantity proportional to the sum or difference of the displacements of $p^1$ and $p^2$ according to the relative direction of the said displacements.

The piston rod $p^3$ carries a rack 17 engaging the gear wheel 18 secured to an indicating pointer 19 cooperating with a dial 20. If the said dial is suitably graduated, a simple reading will show the number of which the displacement of $p^3$ represents the logarithm, that is, the mean speed.

The transmission by the liquid, obtained as shown in Figure 1, is very simple, and it illustrates the general principle of the invention. It is evident that the number of logarithms whose algebraic sum may be obtained, that is, the number of factors of the initial product, is not limited, for the cylinder C may contain as many pistons as desired, these being actuated by the logarithmic cams.

In the modifications shown in Figures 2 to 5, the power transmission is exclusively of a mechanical nature.

In Figure 2, showing the principle employed, $1_a$ is the logarithmic cam for the distance, actuated by the mileage counter K through the medium of the set of shafts and gearing 38—46. The cam $2_a$ is the logarithmic cam of the time which is actuated by the clockwork M by means of the set of shafts and gearing 21 to 36. The cams $1_a$ and $2_a$ are in contact with the rods 3 and 4, urged by the springs $3_1$ and $4_1$, and said rods comprise at their ends opposite the cams, the racks 5 and 7 which engage the double-toothed pinions 8 and 9 of the differential D. In this manner the rotation of 8 and 9 is respectively proportional to the logarithms of the space and time, and the whole of the planetary pinions 10 and 11 rotates with the shaft 12, (as is known) by half the difference between the rotations of 8 and 9, if the number of teeth of the pinions 10 and 11 are equal.

The said shaft 12 drives through the medium of suitable gearing, cam 15 which effects the restitution of the number i. e. the antilog of the corresponding logarithm, and whose outline has the form $r = b \cdot e^v$; $r$ being the radius vector and $v$ the angle. The rod 16 which is held in contact with the cam 15 by the spring 16' carries a rack 17 engaging a pinion 18 secured to the indicating pointer 19 which gives the mean speed at the moment in question, upon the dial 20.

Figures 3 and 4 show a practical arrangement of the system represented in Figure 2, the mechanism being contained in the cylindrical casing S.

The logarithmic cams 1 and 2 consist in this second embodiment of a surface having the shape of a frustrum of cone upon which is formed a helical contact surface adapted to cooperate with the ends of rods 3 and 4 which, when projected parallel with the axis of rotation of the cam, forms a logarithmic spiral. Otherwise stated, the said cams are obtained by the intersection of a truncated cone with a coaxial cylinder whose directrix is a logarithmic spiral or a curve of which the equation, when polar coordinates are used, is: $r = a \log v$; $r$ being the radius vector and $v$ the angle.

As rods 3 and 4 can only slide parallely to their longitudinal direction, the central apertures of the cams 1 and 2 as well as their respective rods 37 and 47 are screw threaded so as to cause said cams, when rotating, to move longitudinally along said threaded rods, the pitch of the threads being equal to the width of the contact surface, so that during the forward motion of the cams along rods 37 and 47, rods 3 and 4 may be continuously applied against said contact surface.

In their rotation on their axes, the said cams put under tension the spiral springs $1^1$ and $2^1$ which are situated in their interior and which serve to bring the said cams to their starting position when they attain the end of their stroke, due to the release of the electromagnetic device, as will be further specified. The two spiral springs $1^1$ and $2^1$, which springs serve to bring the apparatus to zero have their ends secured on the one hand to the cams 1 and 2 and on the other hand to the machine frame, and when the said cams rotate, the said springs are twisted and stretched.

The said cams also carry external teeth 36—46 engaging the pinions 35 and 45 which are respectively driven by the clockwork and by the mileage counter, and which rotate the said cams. The length of the teeth of the pinions 35 and 45 must be such that the teeth 36 and 46 remain constantly engaged with the said pinions in spite of the displacement of the said cams on their shafts.

The diagram shown in Figure 5, which is obtained by sectioning the Figure 4 on the line 5—5 and by reversing upon the plane of the figure the part situated to the left of 5—5, represents the electric connections by which the said cams are brought into the starting position, that is, by which they are returned to zero when at the end of the stroke, or even at any time desired by the driver.

The clockwork M rotates the cam 2 by means of the shaft 21, the clutch 24—25, the shaft 22, the clutch 30—31, the shaft 23, the pinions 32 and 33, the shaft 34, the pinion 35 and the toothed portion 36. In like manner, the mileage counter K rotates the cam 1 by means of the shaft 38, the clutch 39—40, the shaft 41, the pinions 42—43, the shaft 44, the pinion 45 (these two latter parts are not shown in Figures 4 and 5 but are shown in Figure 3), and the teeth 46.

The movable toothed ring 30 of the clutch 30—31 connecting together the shafts 22 and 23 is keyed to the shaft 22 in such manner as to separate it from the ring 31, the toothed ring 39 of the clutch 39—40 being mounted in like manner on the shaft 38. The two movable toothed rings are connected together by a bar 49 which holds them in engagement under the action of the springs 50—51—52. Adjacent the bar 49 is mounted an electromagnet 53 supplied by a storage battery 54 by means of the movable rods 57—59 provided with the studs $57^1$—$57^2$ and $59^1$—$59^2$, and with the fixed contacts 58 and 60. Said contacts 58 and 60, as well as the rods 57 and 59 must be insulated from the casing of the apparatus.

When either of the cams 1 and 2 reaches the end of its displacement along rods 47 or 37 respectively, that cam engages stud $59^2$ or $57^2$ respectively, which brings the corresponding rod 59 or 57 into contact with 60 or 58 respectively, and closes the electric circuit. Electro-magnet 53 is energized and attracts bar 49, thus uncoupling both clutches 30—31 and 39—40, so that the cams which are disconnected from the clockwork and the mileage counter respectively are returned to their initial positions under the action of the spiral springs $1^1$ and $2^1$. At this time, the cams make contact with the studs $57^1$ and $59^1$, thus breaking the circuit of the electro-magnet and again coupling clutches 30—31 and 39—40 respectively. This return of the cams to zero which takes place automatically at the end of the longitudinal movement of either of the cams may also be effected by hand at any time by means of the switch 55.

The said apparatus provides for the measurement of two mean speeds, that is, the mean speed of operating or the mean speed calculated with deduction of the time of stopping of the vehicle, and the mean commercial speed in which the said stopping times are included. The driver will always be able to change from one of these speeds to the other, by uncoupling the clockwork or by leaving it coupled during the stops, due to the device which will be further described. The two shafts 21 and 22 are connected together by a coupling which consists of the toothed rings 24 and 25, the ring 24 being keyed on the shaft 21 and the ring 25 keyed to the shaft 22. The said ring 25 is secured to a toothed wheel or a ratchet wheel 26 engaging a pawl $26^1$. A disk 27 fixed to said ratchet wheel is subjected to the action of a spring 28, which normally acts against the uncoupling.

An electromagnet 29 disposed opposite the disk 27, may at any time uncouple the movable ring 25, that is, it may release the cam 2 from the action of the clockwork, while maintaining it in the position acquired due to the action of the pawl $26^1$ which does not permit the expansion of the spring $2^1$ of the cam 2. The circuit of the electromagnet 29 comprises the manually controlled switch 56 and a switch 61 which is automatically closed when the vehicle stops. This switch 61 is formed, for example, by the pointer $61^a$ of the ordinary speed indicator of the vehicle, which pointer abuts against the contact $61^b$ when the vehicle stops. To obtain the commercial speed, the driver leaves the switch 56 open, thus preventing in all cases the closing of the circuit of the electromagnet 29, and hence leaving the clockwork constantly coupled. On the contrary, to obtain the speed of travel, the driver closes the switch 56, and when the vehicle stops, the pointer $61^a$ closes the circuit and the clockwork remains uncoupled during the whole period of the stop.

It is evident that the arrangement described is susceptible of numerous modifications in detail without departing from the spirit of the invention.

Thus for instance in the second form of construction, the logarithmic cams, instead of being tapered, may consist as in the case of Figure 1 of a cylinder 62 on which is formed a groove (Figures 6 and 7) according to a helical line 63 whose pitch varies according to a logarithmic law, and thus the point 64 of the slide 65 mounted on the rod 3 or 4 and guided by the said line and by the rails 66, will thus be given a displacement proportional to the logarithm of the angular rotation of the cylinder.

It is evident that the different elements forming part of the said apparatus may be used separately upon other apparatus than the aforesaid mean speed indicators.

For example, the logarithmic cams may be employed with meters, calculating machines and the like, and in general with all apparatus adapted to form a product or a quotient of variable quantities.

The zero return device, which is electrically operated in the present apparatus, but which may be operated exclusively by mechanical means, is susceptible of numerous uses upon indicating or recording apparatus of all kinds.

What we claim is:

1. An apparatus of the type described comprising in combination a casing, two threaded rods mounted in said casing, two conoidal spirally grooved logarithmic cams adapted to screw on said rods respectively, two toothed wheels integral with said cams, a toothed drum adapted to mesh with the toothed wheel of the first cam, an odometer, means for driving said drum from said odometer, another toothed drum adapted to mesh with the toothed wheel of the second cam, a watch, means for driving said last mentioned drum from said watch, two rods slidably actuated by said cams respectively, an indicating pointer, and a differential mechanism driven by said slidable rods for actuating said pointer.

2. An apparatus of the type described comprising in combination, a casing, two threaded rods mounted in line with each other in said casing, two conoidal spirally grooved logarithmic cams adapted to screw on said rods respectively, two toothed wheels integral with said cams respectively, a toothed drum adapted to mesh with the toothed wheel of the first cam, an odometer, means for driving said drum from said odometer, another toothed drum adapted to mesh with the toothed wheel of the second cam, a watch, means for driving said last mentioned drum from said watch, two rods slidably actuated by said cams respectively, an indicating pointer, a sun and planet gear for actuating said pointer, and a rack on each of said slidable rods adapted to drive each of the sun wheels of said gear respectively.

3. An apparatus of the type described comprising in combination, two cams, two followers, one for each of said cams respectively, a differential mechanism for combining the movements of said followers, an odometer, transmission means for driving one of the cams from said odometer, a watch, transmission means for driving the other cam from said watch, a clutch in each of said transmission means, a rigid member connecting the movable elements of said clutches whereby they are simultaneously operated, an electro-magnet for actuating said rigid member, contacting means operated by said cams for closing the circuit of said electro-magnet as soon as one of the cams has completed its rotation, resilient means for resetting the cams adapted to operate when the clutches are disengaged, another clutch in the transmission means between the watch and the corresponding cam, an electro-magnet for operating said last mentioned clutch, a speedometer, an electric circuit for energizing said electro-magnet, said circuit including the pointer of said speedometer and a contact stud corresponding to the position of said pointer when the speed of the vehicle is zero, whereby said last mentioned clutch is automatically disengaged when the vehicle is stopped.

In testimony whereof we have signed this specification.

ERIC PELLERIN.
MARCEL HECTOR.
PASCAL JULES CARPENTIER.